United States Patent
Yamamoto et al.

(10) Patent No.: US 9,692,287 B2
(45) Date of Patent: Jun. 27, 2017

(54) VIBRATION ELECTRICITY GENERATION DEVICE

(71) Applicant: STAR MICRONICS CO., LTD., Shizuoka (JP)

(72) Inventors: Koji Yamamoto, Shizuoka (JP); Yasunori Tsukuda, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 244 days.

(21) Appl. No.: 14/725,022

(22) Filed: May 29, 2015

(65) Prior Publication Data

US 2015/0270765 A1    Sep. 24, 2015

Related U.S. Application Data

(63) Continuation of application No. PCT/JP2014/050391, filed on Jan. 14, 2014.

(30) Foreign Application Priority Data

Jan. 22, 2013  (JP) ................. 2013-009478

(51) Int. Cl.
   *H02K 35/02*      (2006.01)
   *H02K 7/18*       (2006.01)
(52) U.S. Cl.
   CPC ........... *H02K 35/02* (2013.01); *H02K 7/1876* (2013.01)
(58) Field of Classification Search
   CPC ........................................ H02K 35/00–35/06
   USPC ........................................ 310/12.12
   See application file for complete search history.

(56) References Cited

U.S. PATENT DOCUMENTS 7,576,454 B2 *   8/2009   Cheung .................. B82Y 25/00
                                                    310/12.12

FOREIGN PATENT DOCUMENTS

JP     H0222079      2/1990
JP     2007-283201   11/2007

OTHER PUBLICATIONS

JPO, Notification of Reasons for Refusal, Office Action, Nov. 8, 2016, Japan.

* cited by examiner

*Primary Examiner* — Ramon M Barrera
(74) *Attorney, Agent, or Firm* — Lex IP Meister, PLLC

(57) ABSTRACT

A vibration electricity generation device according to an embodiment of the present invention includes a fixed unit provided with a coil and a movable unit provided with a magnet. The movable unit is supported on the fixed unit in a suspended manner via a pair of coil springs. The movable unit is thus configured to vibrate in the up and down direction with a rather simple structure. A coil supporting member of the fixed unit is configured to cover a coil accommodating portion from both thickness direction sides thereof and a friction reducing treatment is applied to the surfaces of both thickness direction sides of the coil supporting member. The coefficient of kinetic friction is thus maintained low enough and a pair of guide shafts conventionally used are not required, thereby the electricity generation efficiency being improved.

20 Claims, 11 Drawing Sheets

VIBRATION ELECTRICITY GENERATION DEVICE

CROSS-REFERENCE TO RELATED APPLICATION

This application is a continuation of International Patent Application No. PCT/JP2014/050391, filed on Jan. 14, 2014, which claimed priority of Japanese Patent Application No. 2013-009478 filed on Jan. 22, 2013. The contents of these applications are incorporated herein by reference in their entirety.

BACKGROUND (a) Field

This invention generally relates an electricity generation device generating an induced electromotive force using up and down vibration.

(b) Description of the Related Art

A portable electricity generation device generating electricity using some movements such as human's walking has been known to public.

For example, Japanese Patent Application Publication No. 2008-543254 and Japanese Patent Application Publication No. 2004-159407 disclose vibration electricity generation devices generating an induced electromotive force by up and down vibration of a movable unit provided with a magnet with respect to a fixed unit provided with a coil.

In these vibration electricity generation devices disclosed in the aforementioned patent publications, the fixed unit has a pair of guide shafts extending in the up and down direction and the movable unit is slidably mounted on the guide shafts.

In the vibration electricity generation device of Japanese Patent Application Publication No. 2008-543254, the movable unit is supported on the fixed unit in a suspend ed manner via a pair of coil springs to vibrate in the up and down direction by elastic deformation of the coil springs.

In the vibration electricity generation device of Japanese Patent Application Publication No. 2004-159407, the guide shafts respectively have coil springs on both upper and lower ends thereof. The movable unit vibrates in the up and down direction by elastic rebound of the two sets of the upper and lower coil springs.

SUMMARY

As disclosed in Japanese Patent Application Publication No. 2008-543254, when the movable unit is supported on the fixed unit in a suspended manner via the plurality of coil springs, the vibration electricity generation device is constituted with rather a simple structure.

However, in this kind of vibration electricity generation device, since the movable unit slides in the up and down direction with respect to the respective guide shafts of the fixed unit, the following problems may occur.

A great friction resistance is likely to be caused in the movable unit sliding on the guide shafts by positional inaccuracy of the guide shafts or dimensional inaccuracy of a pair of guide shaft holes formed on the movable unit, inhibiting a smooth up and down vibration of the movable unit, thereby deteriorating the generating efficiency.

An embodiment of the present invention is provided to solve the above described problems. In the vibration electricity generation device adapted to generate an induced electromotive force by using up and down vibration, a simple structure is used to improve the generating efficiency.

An embodiment of the present invention provides such vibration electricity generation device by eliminating the necessity of a pair of guide shafts.

An embodiment of the present invention provides a vibration electricity generation device which generates an induced electromotive force by up and down vibration of a movable unit provided with a magnet with respect to a fixed unit provided with the coil. The movable unit is supported on the fixed unit in a suspended manner via a plurality of coil springs. The fixed unit is provided with a coil supporting member of the shape of a board arranged to extend in up and down direction and the coil is accommodated in a coil accommodating portion formed in the coil supporting member. The movable unit is provided with a pair of yokes arranged on both thickness direction sides of the coil supporting member and the magnet is mounted on the inner side of each of the yokes. The coil supporting member covers the coil accommodating portion from both thickness direction sides thereof. A friction reducing treatment is applied to the surfaces on both thickness direction sides of the coil supporting member.

In this embodiment, the movable unit is provided with a pair of yokes arranged on both thickness direction sides of the coil supporting member and the magnet is mounted on the inner side of each of the yokes. However, this specific structure is not for limiting the scope of the invention but may be modified in a different structure without departing from the scope of the invention.

The friction reducing treatment is not restricted to a specific method but any kind of treatment which reduces the coefficient of kinetic friction may be applied. For example, painting or attachment of a film, etc. may be applied. It may be preferable that the friction reducing treatment lessens the coefficient of kinetic friction to a value equal to or less than 0.3. It may be further preferable that the friction reducing treatment lessens the coefficient of kinetic friction to a value equal to or less than 0.25.

As described above, in the vibration electricity generation device according to an embodiment of the present invention, the movable unit is supported on the fixed unit in a suspended manner via the plurality of coil springs. The movable unit is thus adapted to vibrate in the up and down direction with a comparatively simple structure.

In this case, the coil supporting member of the fixed unit is formed to cover the coil accommodating portion from both thickness direction sides thereof and a friction reducing treatment is applied to the surfaces on both thickness direction sides of the coil supporting member. Accordingly, the following effects are expected.

The structure of the present invention keeps the coefficient of kinetic friction low enough even if the up and down vibrating movable unit is displaced in the thickness direction of the coil supporting member into contact therewith. This eliminates the need for a pair of guide shafts used in a conventional vibration electricity generation device.

Conventionally, a great friction resistance is likely to be caused in the movable unit sliding on the guide shafts by positional inaccuracy of the guide shafts or dimensional inaccuracy of a pair of guide shaft holes formed on the movable unit. The present invention avoids such problem and allows smooth up and down vibration of the movable unit, thereby improving the generating efficiency.

As described above, according to an embodiment of the present invention, in the vibration electricity generation device adapted to generate an induced electromotive force by using up and down vibration, a simple structure is used to improve the generating efficiency. The vibration electricity generation device is thus suitable as a portable device.

Further, according to an embodiment of the present invention, since the pair of guide shafts conventionally used are not required, the vibration electricity generation device may be reduced in size and weight.

The coil supporting member may include a main body in which a coil accommodating portion is provided and a friction reducing film attached on at least one of the both thickness direction sides of the main body to cover the coil accommodating portion. This embodiment provides an easy and reliable way to apply a friction reducing treatment on the surfaces on both thickness direction sides of the coil supporting member.

In this case, the friction reducing film may be a resin film, paper or an aluminum foil. When an ultrahigh molecular weight polyethylene film is used, the coefficient of kinetic friction generated during up and down vibration of the movable unit can be reduced by a great amount. At this time, the ultrahigh molecular weight polyethylene film is defined as a polyethylene film having a molecular weight of at least 1 million.

In the above embodiment, a friction reducing treatment may be applied to both right and left side surfaces of the coil supporting member. Such embodiment keeps the coefficient of kinetic friction low enough even if the movable unit is displaced in the transverse direction to the thickness direction of the coil supporting member, ensuring a smooth up and down vibration of the movable unit. Accordingly, the electricity generation efficiency of the vibration electricity generation device is more improved.

In the above embodiment, the magnets may be mounted on the yokes via the magnet supporting member for commonly positioning the magnets. Further, the lower end of each of the coil springs is held by the common magnet supporting member. This embodiment may provide the following effects.

Since the magnets are mounted on the yokes via the magnet supporting member, a magnetic circuit is formed with high accuracy. Further, since the lower end of each of the coil springs is held by the magnet supporting member, the coil springs are thus easily mounted on the movable unit.

In the above embodiment, the pair of coil springs may be arranged on both sides of the pair of right and left side surfaces of the coil supporting member and diagonally disposed with respect to the center of the coil supporting member in a top view. By this embodiment, while the thickness of the vibration electricity generation device is maintained to be thin, the up and down vibrating movable unit may be restrained from being displaced in the thickness direction of the coil supporting member as well as in the direction perpendicular to the thickness direction thereof.

In the above embodiment, a weight member may be formed on either side of each of the yokes so as to extend to a position facing one of the right and left side surfaces of the coil supporting member. The weight member may be integrally formed with or separately formed from the yoke. By this embodiment, inertial mass of the movable unit may be easily adjusted. Therefore, vibration cycle of the movable unit may be easily controlled to match with the up and down moving cycle of a human walking.

In the above embodiment, the weight member may be disposed to confine the lower end of the coil spring held by the magnet supporting member from below. By this embodiment, the coil springs are restrained from leaving their proper positions while the vibration electricity generation device is operated. And connection structure between the magnet supporting member and the lower end of the coil springs may be simplified.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DETAILED DESCRIPTION

Figure 1:
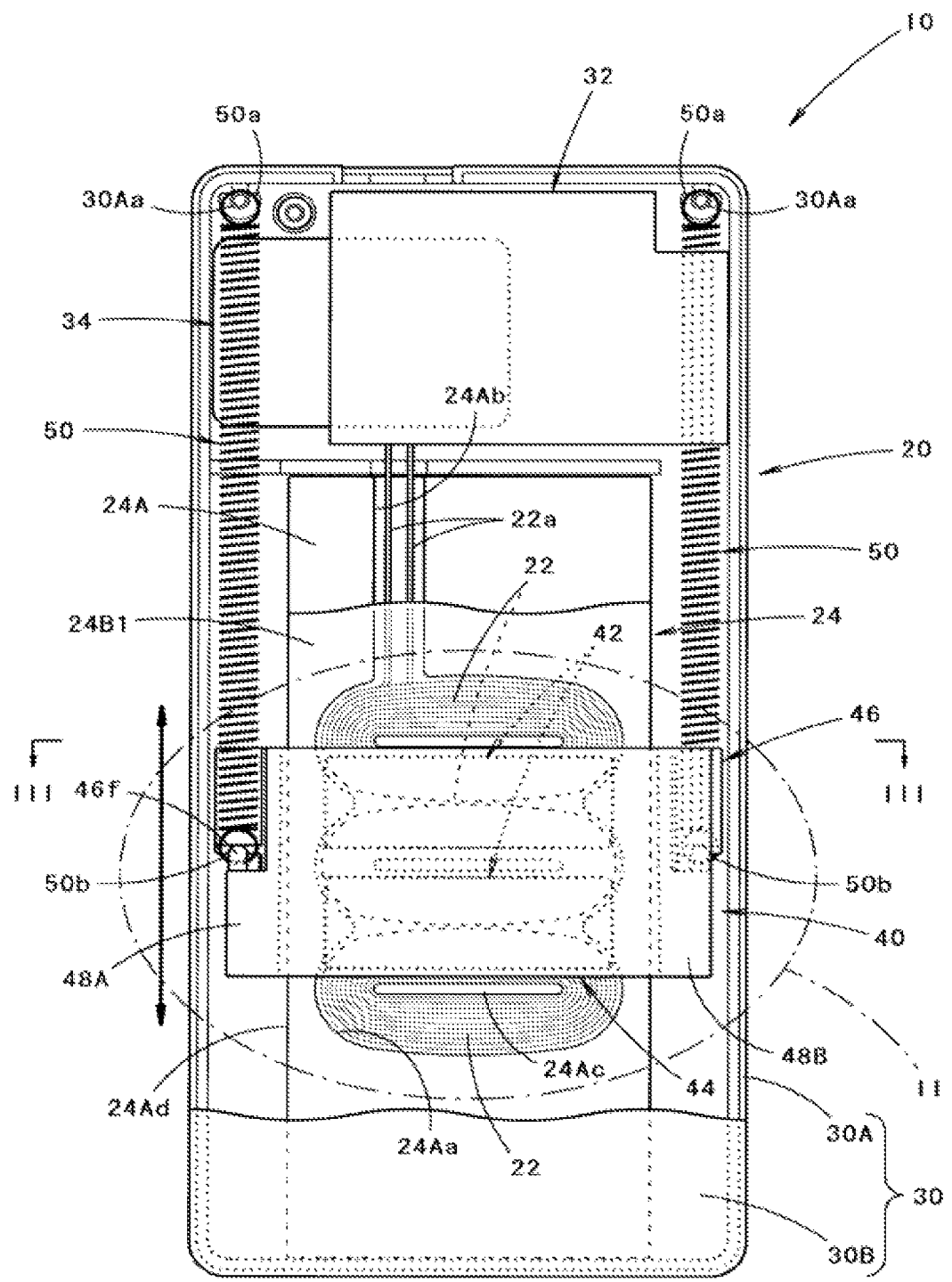
FIG. 1 is a front view of a vibration electricity generation device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

An embodiment of the present invention is described with reference to the drawings.

Figure 2:
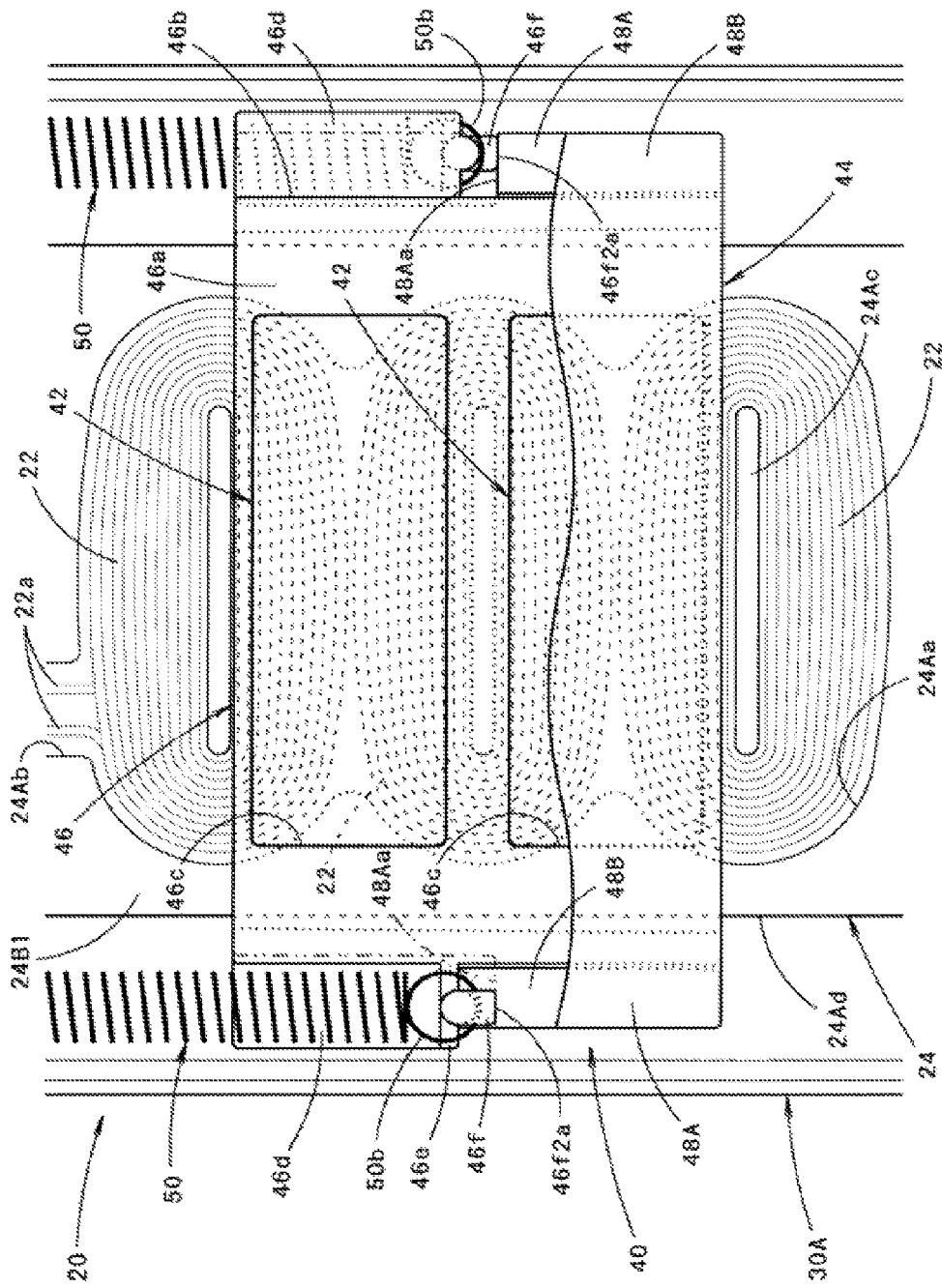
FIG. 2 is an enlarged view showing the portion II of FIG. 1.
Figure 3:
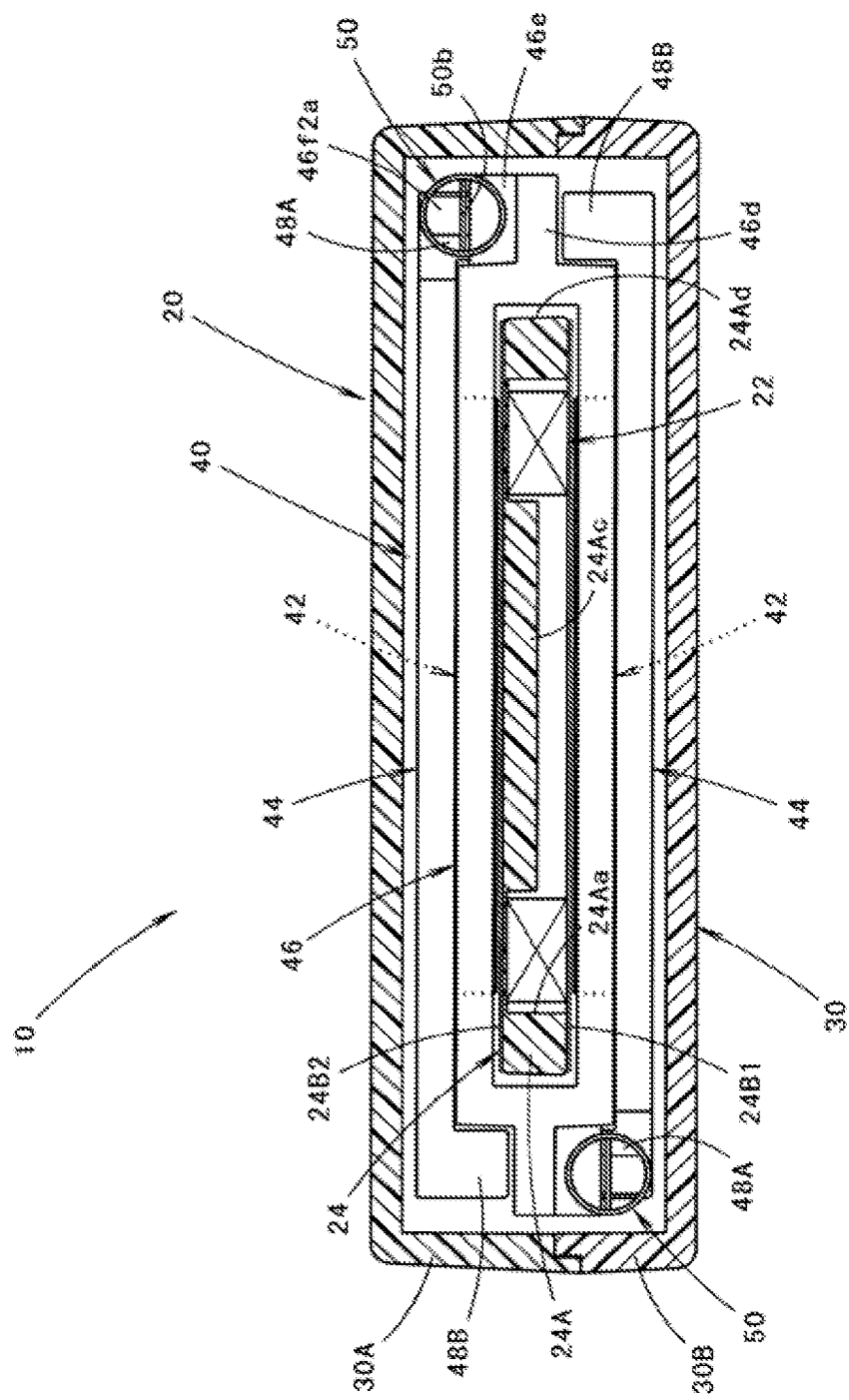
FIG. 3 is a sectional view showing the cross section cut along the line III-III.
Figure 4:
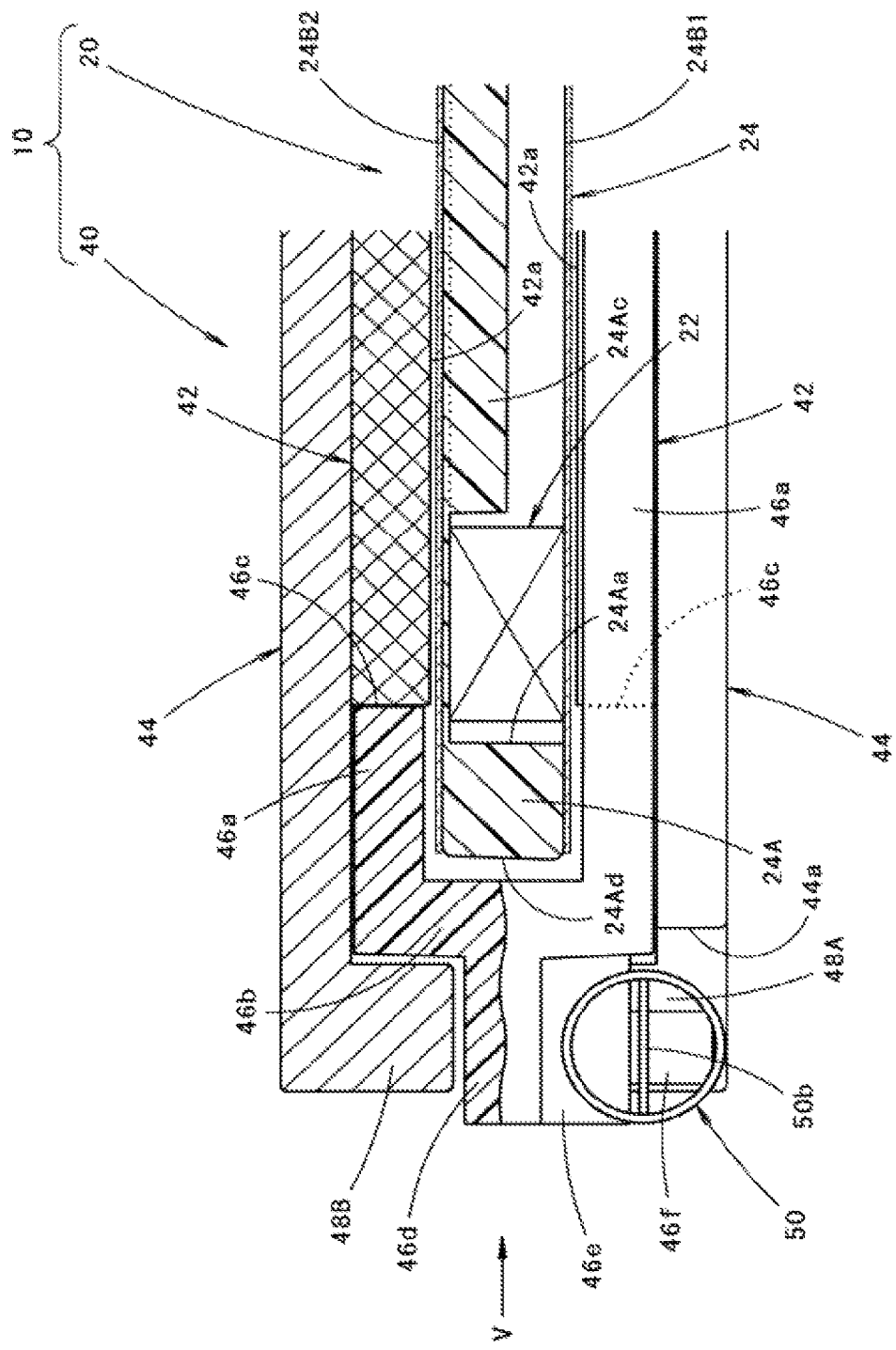
FIG. 4 is an enlarged view showing the main portion of FIG. 3.

FIG. 1 is a front view of a vibration electricity generation device according to an embodiment of the present invention. FIG. 2 is an enlarged view showing the portion II of FIG. 1. FIG. 3 is a sectional view showing the cross section cut along the line III-III. FIG. 4 is an enlarged view showing the main portion of FIG. 3.

As illustrated in the drawings, a vibration electricity generation device 10 according to an embodiment of the present invention includes a fixed unit 20 provided with a coil 22 and a movable unit 40 provided with a magnet 42. The movable unit 40 is supported on the fixed unit 20 in a suspended manner via a pair of coil springs 50.

The vibration electricity generation device 10 generates an induced electromotive force on the coil 20 by the movable unit 40 vibrating in the up and down direction with respect to the fixed unit 20. Up and down vibration of the movable unit 40 may be generated, for example, as someone walks carrying the vibration electricity generation device 10 in his/her bag.

At first, the fixed unit 20 will be described in detail.

The fixed unit 20 includes a vertically-long case 30 and a coil supporting member 24, a circuit board 32, and a secondary battery 34 respectively housed in the case 30.

The case 30 consists of a resin-made case main body 30A opening forward and a case cover 30B attached to the opening of the case main body 30A. The case 30 has a front view of a vertically long rectangle and a predetermined depth in the front and back direction.

The circuit board 32 and the secondary battery 34 are disposed at the upper part of the case 30. In the front view, the circuit board 32 is disposed closer to the right side while the secondary battery 34 is to the left side. The circuit board 32 partially overlaps the secondary battery 34 with the circuit board 32 on the front side.

The coil supporting member 24 may be a board having a front view of a vertically long rectangle and positioned below the circuit board 32 and the secondary battery 34.

The coil supporting member 24 includes a supporting main body 24A provided with a coil accommodating portion 24Aa for accommodating the coil 22 and two friction reducing films 24B1 and 24B2 attached to entirely cover the front and back surfaces of the supporting main body 24A. The supporting main body 24A may be made of a general purpose resin such as acrylonitrile-butadiene-styrene resin (ABS resin). The friction reducing films 24B1 and 24B2 may be made of an ultrahigh molecular weight polyethylene film ranging approximately from 0.05 mm to 0.2 mm in thickness.

There may be a plurality of the coils 22 arranged adjacent to each other in the up and down direction. In the front view, the winding surface of the coil 22 has the shape of an ellipse elongated in the horizontal direction. The coils 22 are connected in series.

The coil accommodating portion 24Aa has an inner shape wrapping the three coils 22. The supporting main body 24A is provided with a groove 24Ab extended from the coil accommodating portion 24Aa to the upper end of the supporting main body 24A. A pair of coil terminals 22a extended from the coils 22 are inserted into the groove 24Ab and guided to the circuit board 32. The coil accommodating portion 24Aa and the groove 24Ab are opened forward. The supporting main body 24A is provided with three protrusions 24Ac elongated in the horizontal direction. The protrusions 24Ac are arranged with intervals in the up and down direction to be respectively engaged with air cores of the coils 22, thereby respectively positioning the coils 22.

The coil accommodating portion 24Aa is blocked by the friction reducing film 24B1 attached on the front surface of the supporting main body 24A. Therefore, the coil 22 is prevented from unexpectedly leaving the coil accommodating portion 24Aa.

Next, the movable unit 40 will be described in detail.

Figure 5A:
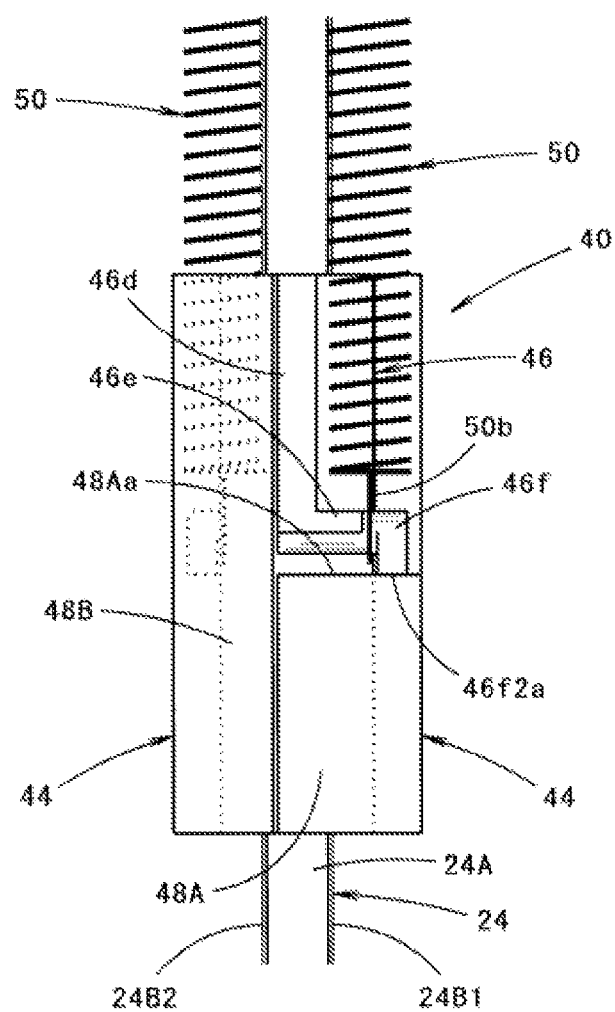
FIG. 5A is a figure viewing from the V direction of FIG. 4 showing the movable unit along with the coil supporting member and FIG. 5B is an exploded view of FIG. 5A.
Figure 5B:
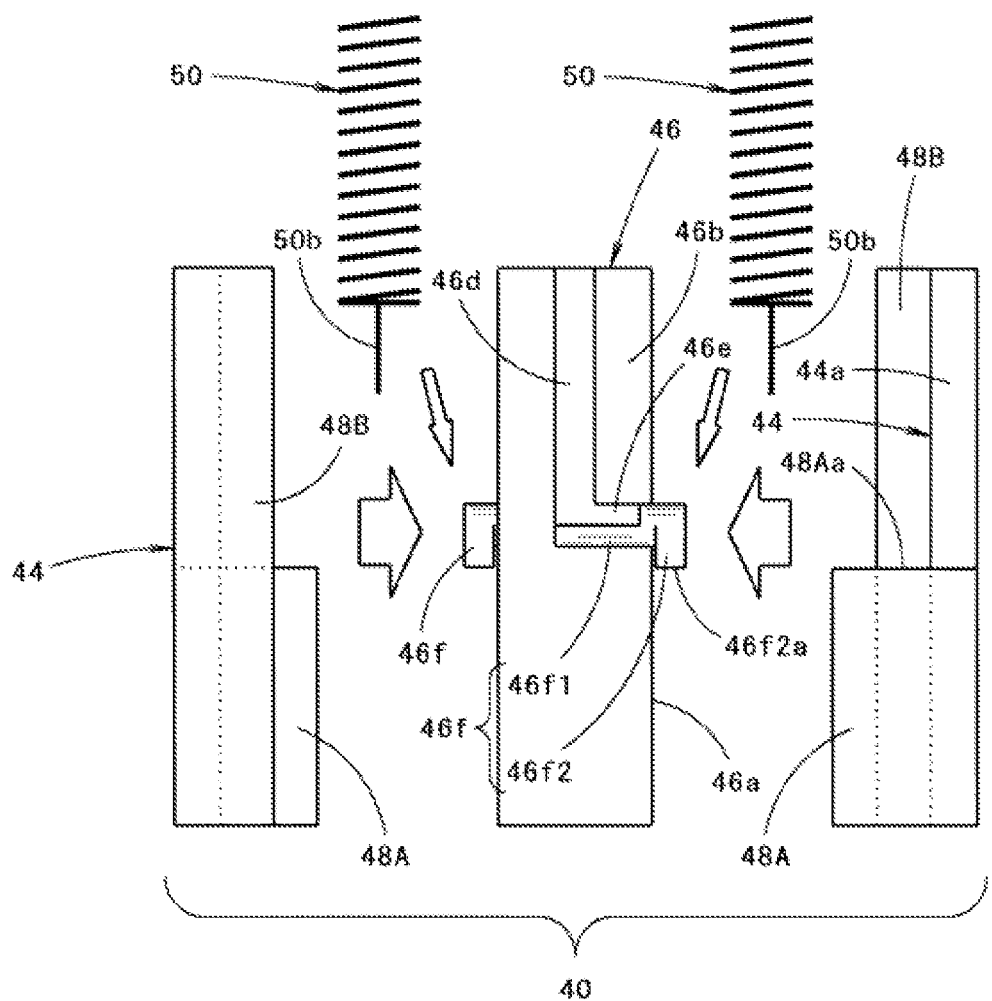
Figure 6:
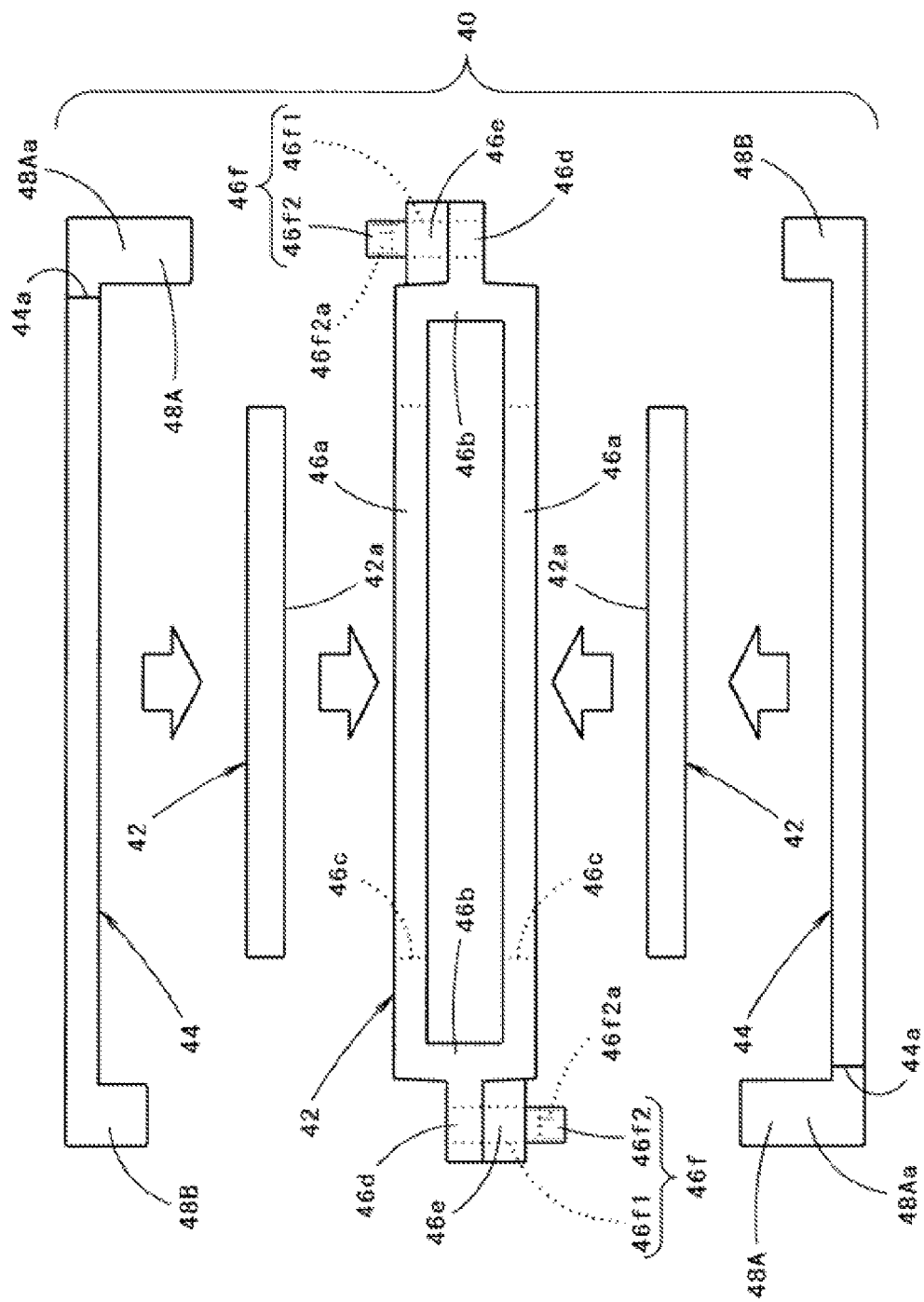
FIG. 6 is an exploded view of a movable unit according to an embodiment of the present invention.

FIG. 5A is a figure viewing from the V direction of FIG. 4 showing the movable unit 40 along with the coil supporting member 24 and FIG. 5B is an exploded view of FIG. 5A. FIG. 6 is an exploded view of the movable unit 40 according to an embodiment of the present invention.

As illustrated in the drawings, the movable unit 40 includes a pair of yokes 44 respectively arranged on the front and back sides of the coil supporting member 24. Each of the yokes 44 has the magnet 42 mounted on the inner side thereof.

The yoke 44 may have the two magnets 42 arranged at an interval in the up and down direction in such a manner that the upper magnet has a different polarity from the lower magnet and further the polarities of the upper and lower magnets on the yoke 44 are respectively different from the opposite upper and lower magnets of the opposite yoke 44. In other words, the polarity of the magnet 42 on one of the yokes 44 coincide with the polarity of the diagonally opposite magnet on the other of the yokes 44.

The magnet 42 may be an N-48 neodymium magnet having the shape of a horizontally long rectangular parallelepiped. The magnets 42 are mounted on the yokes 44 via a magnet supporting member 46 for commonly positioning the magnets 42.

The magnet supporting member 46 may be made of a resin such as acrylonitrile-butadiene-styrene resin (ABS resin) having a horizontal cross-section of a horizontally long rectangle enclosing the coil supporting member 24. The magnet supporting member 46 has a pair of front and back vertical walls 46a respectively having two horizontally long penetration holes 46c arranged at an predetermined interval in the up and down direction.

The magnets 42 are respectively inserted in the penetration holes 46c and attracted to the yokes 44 by magnetic force with the inner surfaces 42a of the magnets 42 slightly ahead inward of the inner surfaces of the vertical walls 46a.

Accordingly, a magnetic circuit which generates magnetic flux crossing a space created by the pairs of upper and lower magnets 42 of the pair of front and back yokes 44 is formed in the movable unit 40.

The pair of coil springs 50 are arranged on both sides of right and left side surfaces 24Ad of the coil supporting member 24. In the top view, the pair of coil springs 50 are diagonally arranged with respect to the center of the coil supporting member 24.

In detail, the right side coil spring 50 is arranged to pass the back side of the circuit board 32 while the left side coil spring 50 the front side of the secondary battery 34. The coil spring 50 each has an upper end 50a to be held by an engaging pin 30Aa formed on each upper corner of the case main body 30A and a lower end 50b to be held by the magnet supporting member 46.

Next, the magnet supporting member 46 will be described in detail.

As illustrated in FIG. 5A, FIG. 5B, and FIG. 6, in the magnet supporting member 46, a pair of right and left vertical flanges 46d are formed on a pair of right and left side walls 46b.

The vertical flange 46d protrudes from the outer surface of the side wall 46b in the thickness-direction middle thereof. The upper end of the vertical flange 46d is aligned with the upper end of the side wall 46b and the lower end thereof is roughly aligned with the middle of the side wall 46b.

The left vertical flange 46d has a horizontal flange 46e extending forward from the lower end thereof. A holding portion 46f for holding the left side coil spring 50 is formed in the horizontally middle of the horizontal flange 46e.

The holding portion 46f consists of a cylindrical portion 46f1 extended in the front and back direction and a front end flange 46f2 extended downward from the front end of the cylindrical portion 46f1. The front end flange 46f2 has a back surface slightly ahead of the front surface of the front vertical wall 46a. The front end flange 46f2 prevents the coil spring 50 engaged with the cylindrical portion 46f1 from dropping forward. The front end flange 46f2 has a bottom surface 46f2a which is horizontally extended.

In a similar manner, the right vertical flange 46d has the horizontal flange 46e and the holding portion 46f. The horizontal flange 46e and the holding portion 46f of the right vertical flange 46d are point-symmetrical to those of the left vertical flange 46*d* with respect to the center of the magnet supporting member 46 in the top view. The holding portion 46*f* of the right vertical flange 46*d* holds the lower end 50*b* of the right side coil spring 50.

The yoke 44 each may be made of soft iron having the shape of a horizontally-long rectangle of approximately the same size as the vertical wall 46*a* of the magnet supporting member 46 in the front view. Weight members 48A and 48B are integrally formed with the yoke 44 on both right and left sides thereof so as to extend to the position opposite to the right and left end surfaces 24Ad of the coil supporting member 24. The weight members 48A and 48B are formed as vertical walls with a uniform thickness in the front and back direction.

With regard to the front-side yoke 44, the left-side weight member 48A is extended from the lower end of the yoke 44 to the middle thereof in the up and down direction while the right-side weight member 48B is to the upper end of the yoke 44. The weight member 48A has a top surface 48Aa positioned at approximately the same height as the bottom surface 46*f*2*a* of the front end flange 46*f*2 of the holding portion 46*f*. And the weight member 48A has a back surface approximately flush with the back surface of the vertical flange 46*d* of the magnet supporting member 46. Further, the weight member 48B has a back surface slightly ahead of the front surface of the vertical flange 46*d* of the magnet supporting member 46.

The weight members 48A and 48B integrally formed with the back side yoke 44 are point-symmetrical with the weight members 48A and 48B of the front side yoke 44 with respect to the center of the magnet supporting member 46 in the top view.

With the lower end 50*b* of each coil spring 50 held by the holding portion 46*f* of the magnet supporting member 46, the pair of yokes 44 are mounted on the magnet supporting member 46 from both the front and back sides thereof. Then, the bottom surface 46*f*2*a* of the front end flange 46*f*2 of the holding portion 46*f* is brought to face the top surface 48Aa of each weight member 48A almost without a gap. Therefore, the weight member 48A confines the lower end 50*b* of the coil spring 50 held by the holding portion 46*f* of the magnet supporting member 46 from below. The connection of the coil spring 50 is thereby surely maintained.

On the weight member 48A side, the upper half of the side surface of the yoke 44 above the weight member 48A constitutes a cutout surface 44*a* stepped inward with respect to the lower half thereof coupled to the yoke 44 to avoid interference with the coil spring 50.

Operation and effect of the vibration electricity generation device according to an embodiment of the present invention will be described.

In the vibration electricity generation device 10 according to an embodiment of the present invention, the movable unit 40 provided with the magnet 42 is supported on the fixed unit 20 provided with the coil 22 in a suspended manner via the pair of coil springs 50. The movable unit 40 is thus adapted to vibrate in the up and down direction with a comparatively simple structure.

In this case, the coil supporting member 24 of the fixed unit 20 is formed so as to cover the coil accommodating portion 24Aa from both thickness-direction sides thereof and a friction reducing treatment is applied to the surfaces of both thickness-direction sides of the coil supporting member 24. Accordingly, the following effects are expected.

The structure of the present invention keeps the coefficient of kinetic friction low enough even if the up and down vibrating movable unit 40 is displaced in the thickness direction of the coil supporting member 24 into contact therewith. This eliminates the need for a pair of guide shafts used in a conventional vibration electricity generation device.

Conventionally, a great friction resistance is likely to be caused in the movable unit sliding on the guide shafts by positional inaccuracy of the guide shafts or dimensional inaccuracy of a pair of guide shaft holes formed on the movable unit. The present invention avoids such problem and allows smooth up and down vibration of the movable unit 40, thereby improving the generating efficiency.

As described above, according to an embodiment of the present invention, in the vibration electricity generation device 10 adapted to generate an induced electromotive force by using up and down vibration, a simple structure is used to improve the generating efficiency. The vibration electricity generation device 10 is thus suitable as a portable device.

Further, according to an embodiment of the present invention, since the pair of guide shafts conventionally used are not required, the vibration electricity generation device 10 may be reduced in size and weight.

The coil supporting member 24 may include the main body 24A in which the coil accommodating portion 24Aa is provided and the friction reducing films 24B1 and 24B2 attached to both the thickness-direction sides of the main body 24A to cover the coil accommodating portion 24Aa. This embodiment provides an easy and reliable way to apply a friction reducing treatment on the surfaces of both thickness-direction sides of the coil supporting member 24.

The coil accommodating portion 24Aa is blocked by the friction reducing film 24B1 attached on the front surface of the supporting main body 24A. Therefore, the coil 22 is prevented from unexpectedly dropping out of the coil accommodating portion 24Aa.

In this embodiment, an ultrahigh molecular weight polyethylene film is applied as the friction reducing films 24B1 and 24B2. Accordingly, the coefficient of kinetic friction generated when the movable unit 40 vibrates in the up and down direction is greatly reduced, particularly to 0.25 or less.

In this embodiment, since the magnets 42 are mounted on the yokes 44 via the magnet supporting member 46 for commonly positioning the magnets, a magnetic circuit is formed with high accuracy. Further the lower end 50*b* of each of the coil springs 50 is held by the magnet supporting member 50 and the coil springs 50 are thus easily mounted on the movable unit 40

In this embodiment, the pair of coil springs 50 are arranged on both sides of right and left side surfaces 24Ad of the supporting main body 24A of the coil supporting member 24 and diagonally arranged with respect to the center of the coil supporting member 24 in a top view. By this embodiment, while the thickness of the vibration electricity generation device 10 is reduced, the up-and-down vibrating movable unit 40 may be restrained from being displaced in the thickness direction of the coil supporting member 24 as well as in the direction perpendicular to the thickness direction thereof.

In this embodiment, since the weight members 48A and 48B are integrally formed with the yokes 44 on both right and left sides thereof so as to extend to the position opposite to the right and left side surfaces 24Ad of the coil supporting member 24, inertial mass of the movable unit 40 is able to be easily adjusted without increasing the number of parts, particularly by varying the thickness of the weight members 48A and 48B. Therefore, vibration cycle of the movable unit 40 is able to be easily controlled to match with the cycle of up and down motion during walking.

In this embodiment, the weight members 48A has the top surface 48Aa to confine the lower end 50b of the coil spring 50 held by the holding portion 46f of the magnet supporting member 46 from below. By this embodiment, the coil springs 50 are restrained from leaving their proper positions when the vibration electricity generation device 10 is operated. The connection structure of the lower end 50b of the coil springs 50 with respect to the magnet supporting member 46 are thus simplified.

In the above described embodiment, though the pair of coil springs 50 are arranged facing the right and left side surfaces 24Ad of the supporting main body 24A of the coil supporting member 24, they may be arranged on the front and back sides of the coil supporting member 24. Further, three or more coil springs 50 may be applied.

A modified embodiment will be described.

At first, a first modified embodiment will be described.

Figure 7:
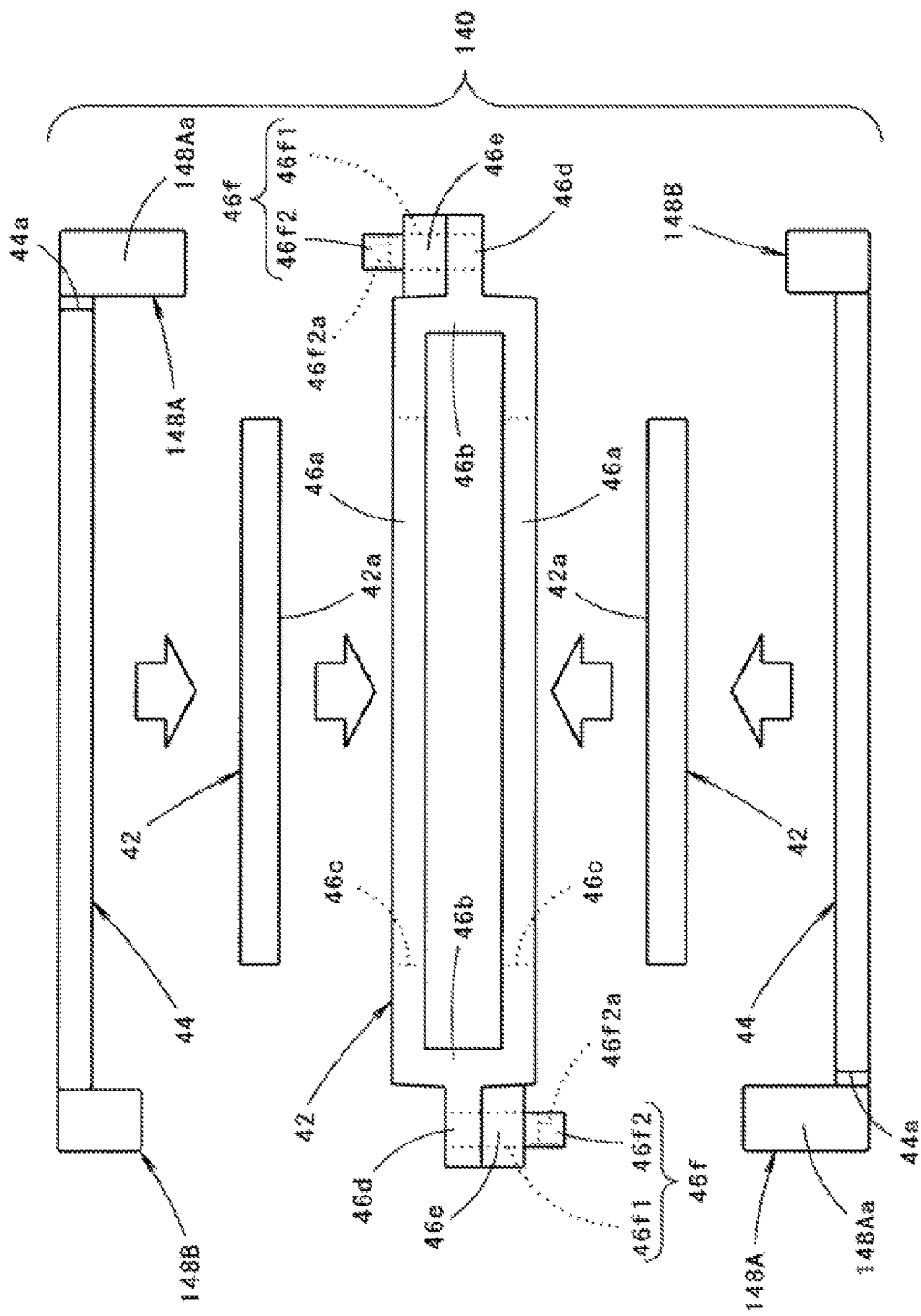
FIG. 7 is an exploded view of a movable unit according to another embodiment of the present invention.

FIG. 7 is an exploded view of a movable unit 140 according to another embodiment of the present invention.

As illustrated in FIG. 7, the basic structure of the movable unit 140 is almost the same as that of the foregoing embodiment but the structure of weight members 148A and 148B which are arranged on both side ends of the yokes 44 is different from that of the foregoing embodiment.

In this embodiment, the weight members 148A and 148B are separately formed from the yokes 44. In detail, each of the weight members 148A and 148B is a soft iron block which has a horizontal cross-section of a vertically long rectangle. The weight members 148A and 148B are fixed on the yokes 44 by adhesion or welding.

The weight member 148A fixed on the yokes 44 also confines the lower end 50b of the coil spring 50 held by the holding portion 46f of the magnet supporting member 46 from below, thereby firmly maintaining the connection of the coil spring 50.

In this modified embodiment, the same effects and operations as the foregoing embodiment may be obtained.

According to this modified embodiment, the weight members 148A and 148B may be made of material of a higher specific gravity than the yokes 44. Therefore, the weight members 148A and 148B may perform an improved role as a weight.

Next, a second modified embodiment will be described.

Figure 8A:
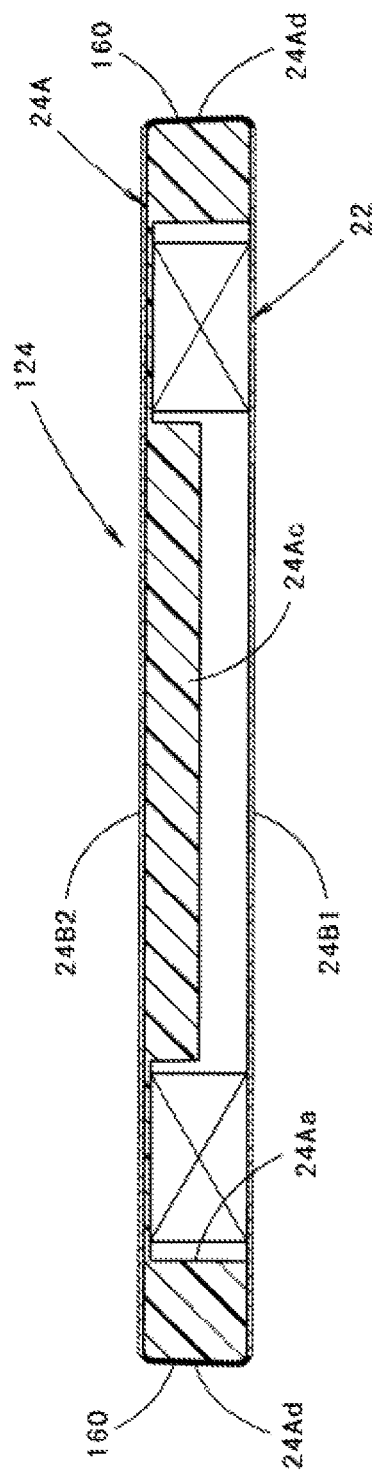
FIG. 8A, FIG. 8B, and FIG. 8C are sectional views of coil supporting members according to three different embodiments of the present invention.

FIG. 8A is a sectional view of a coil supporting member 124 according to a modified embodiment of the present invention. FIG. 8A corresponds to an enlarged view showing the main portion of FIG. 3.

As illustrated in FIG. 8A, the basic structure of the coil supporting member 124 of this modified embodiment is almost the same as that of the foregoing embodiments but the pair of right and left side surfaces 24Ad of the supporting main body 24A are also given a friction reducing treatment.

Namely, in this modified embodiment, the right and left side surfaces 24Ad of the coil supporting member 124 constitute friction reduced surfaces 160 having a friction reducing treatment such as Teflon (registered trade mark) coating applied.

According to this modified embodiment, even if the up and down vibrating movable unit 40 is displaced in the direction perpendicular to the thickness direction of the coil supporting member 124 into contact therewith, the coefficient of kinetic friction is reduced to 0.25 or less, thereby ensuring a smooth up and down vibration of the movable unit 40. Accordingly, the electricity generation efficiency of the vibration electricity generation device 10 is more improved.

Next, a third modified embodiment will be described.

Figure 8B:
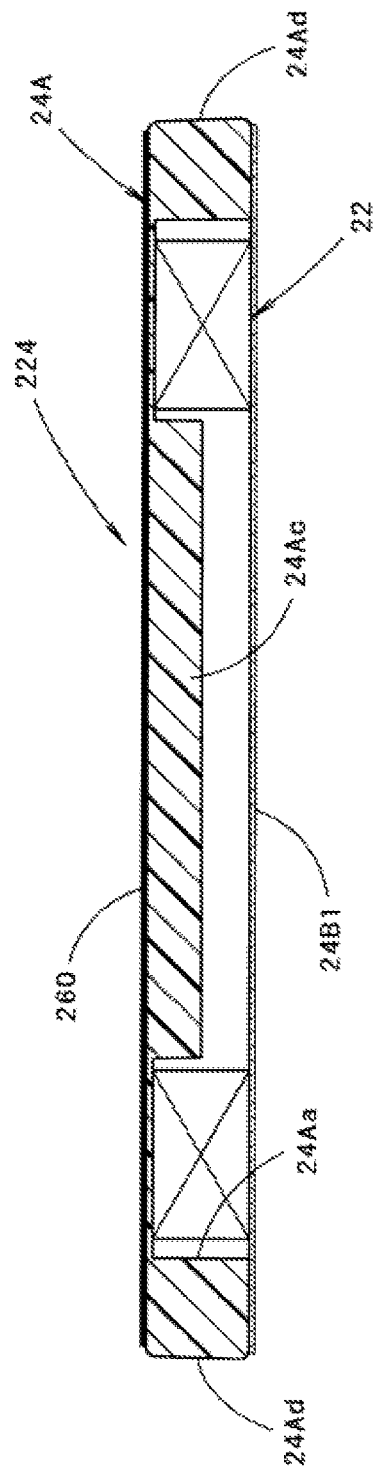

FIG. 8B is a sectional view of a coil supporting member 224 according to a modified embodiment of the present invention. FIG. 8B corresponds to an enlarged view showing the main portion of FIG. 3.

As illustrated in FIG. 8B, the basic structure of the coil supporting member 224 of this modified embodiment is almost the same as that of the foregoing embodiments but the back surface of the supporting main body 24A is formed as a friction reduced surface 260 having a friction reducing treatment such as Teflon coating applied instead of the friction reducing film 24B2 being attached.

In this modified embodiment, the same effects and operations as the foregoing embodiment may be obtained.

Next, a fourth modified embodiment will be described.

Figure 8C:
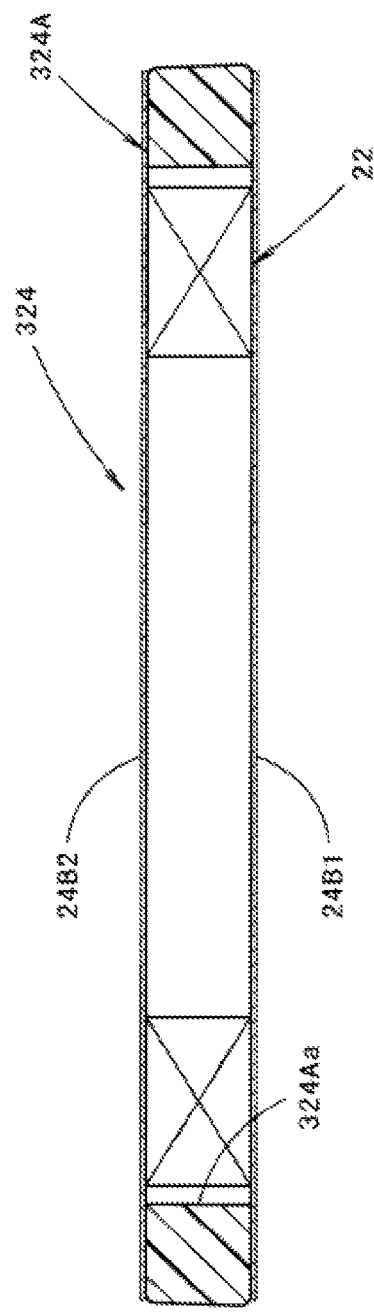

FIG. 8C is a sectional view of a coil supporting member 324 according to a modified embodiment of the present invention. FIG. 8C corresponds to an enlarged view showing the main portion of FIG. 3.

As illustrated in FIG. 8C, the basic structure of the coil supporting member 324 of this modified embodiment is almost the same as that of the foregoing embodiments but a supporting main body 324A.

Namely, the coil supporting member 324 includes the supporting main body 324A provided with a coil accommodating portion 324Aa having an inner shape wrapping the three coils 22. The coil accommodating portion 324Aa is a through hole penetrating the coil supporting member 324 in the front and back direction. The two friction reducing films 24B1 and 24B2 are respectively adhered to the front and back surfaces of the supporting main body 324A to block up the coil accommodating portion 324Aa. In this case, the three coils 22 are first adhered to the friction reducing film 24B1 or 24B2 and then housed in the coil accommodating portion 324Aa.

In this modified embodiment, the same effects and operations as the foregoing embodiments may be obtained.

The values disclosed as specific data in the foregoing embodiments are merely exemplary ones and may be appropriately changed.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A vibration electricity generation device, comprising:
a fixed unit provided with a coil;
a movable unit provided with a magnet; and
a plurality of coil springs,
wherein the vibration electricity generation device is adapted to generate an induced electromotive force in the coil by the movable unit vibrating in the up and down direction with respect to the fixed unit,
wherein the movable unit is supported on the fixed unit in a suspended manner via the plurality of coil springs,
wherein the fixed unit comprises a coil supporting member in the shape of a board extended in the up and down direction and the coil is accommodated in a coil accommodating portion formed in the coil supporting member, wherein the movable unit comprises a pair of yokes arranged on both thickness-direction sides of the coil supporting member and the magnet is mounted on the inner surface of each of the yokes, wherein the coil supporting member is formed so as to cover the coil accommodating portion from both thickness-direction sides thereof, and wherein a friction reducing treatment is applied to the surfaces on both thickness-direction sides of the coil supporting member.

2. The vibration electricity generation device of claim 1, wherein the coil supporting member comprises:

a main body in which the coil accommodating portion is provided; and a friction reducing film attached to at least one of the surfaces on both thickness direction sides of the main body to cover the coil accommodating portion.

3. The vibration electricity generation device of claim 2, wherein the friction reducing film comprises an ultrahigh molecular weight polyethylene film.

4. The vibration electricity generation device of claim 3, wherein the friction reducing treatment is further applied to a pair of side surfaces of the coil supporting member.

5. The vibration electricity generation device of claim 2, wherein the friction reducing treatment is further applied to a pair of side surfaces of the coil supporting member.

6. The vibration electricity generation device of claim 1, wherein the friction reducing treatment is further applied to a pair of side surfaces of the coil supporting member.

7. The vibration electricity generation device of claim 6, wherein the magnet is mounted on the yoke via a magnet supporting member for commonly positioning the magnet, and wherein the lower end of the coil springs is each held by the magnet supporting member.

8. The vibration electricity generation device of claim 5, wherein the magnet is mounted on the yoke via a magnet supporting member for commonly positioning the magnet, and wherein the lower end of the coil springs is each held by the magnet supporting member.

9. The vibration electricity generation device of claim 4, wherein the magnet is mounted on the yoke via a magnet supporting member for commonly positioning the magnet, and wherein the lower end of the coil springs is each held by the magnet supporting member.

10. The vibration electricity generation device of claim 3, wherein the magnet is mounted on the yoke via a magnet supporting member for commonly positioning the magnet, and wherein the lower end of the coil springs is each held by the magnet supporting member.

11. The vibration electricity generation device of claim 2, wherein the magnet is mounted on the yoke via a magnet supporting member for commonly positioning the magnet, and wherein the lower end of the coil springs is each held by the magnet supporting member.

12. The vibration electricity generation device of claim 1, wherein the magnet is mounted on the yoke via a magnet supporting member for commonly positioning the magnet, and wherein the lower end of the coil springs is each held by the magnet supporting member.

13. The vibration electricity generation device of claim 12, wherein the plurality of coil springs comprises a pair of coil springs arranged on both sides of the pair of side surfaces of the coil supporting member and wherein the pair of coil springs are diagonally arranged with respect to the center of the coil supporting member in a top view.

14. The vibration electricity generation device of claim 11, wherein the plurality of coil springs comprises a pair of coil springs arranged on both sides of the pair of side surfaces of the coil supporting member and wherein the pair of coil springs are diagonally arranged with respect to the center of the coil supporting member in a top view.

15. The vibration electricity generation device of claim 10, wherein the plurality of coil springs comprises a pair of coil springs arranged on both sides of the pair of side surfaces of the coil supporting member and wherein the pair of coil springs are diagonally arranged with respect to the center of the coil supporting member in a top view.

16. The vibration electricity generation device of claim 15, further comprising a weight member integrally or separately formed on a side end of each of the yokes to be extended to a position facing the side surface of the coil supporting member.

17. The vibration electricity generation device of claim 14, further comprising a weight member integrally or separately formed on a side end of each of the yokes to be extended to a position facing the side surface of the coil supporting member.

18. The vibration electricity generation device of claim 13, further comprising a weight member integrally or separately formed on a side end of each of the yokes to be extended to a position facing the side surface of the coil supporting member.

19. The vibration electricity generation device of claim 18, wherein the weight member is arranged to confine the lower end of the coil spring held by the magnet supporting member from below.

20. The vibration electricity generation device of claim 17, wherein the weight member is arranged to confine the lower end of the coil spring held by the magnet supporting member from below.

* * * * *